US006795870B1

(12) United States Patent
Bass et al.

(10) Patent No.: US 6,795,870 B1
(45) Date of Patent: Sep. 21, 2004

(54) METHOD AND SYSTEM FOR NETWORK PROCESSOR SCHEDULER

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,907

(22) Filed: Apr. 13, 2000

(51) Int. Cl.⁷ .............................................. G06F 3/00
(52) U.S. Cl. ............................ 710/6; 710/5; 710/58; 710/60; 709/233; 712/405
(58) Field of Search .................... 370/60, 84, 230, 370/235, 412, 428, 395, 218; 710/5, 56, 52, 60, 6, 58; 712/405; 709/233

(56) References Cited

U.S. PATENT DOCUMENTS

| 5,260,935 A | 11/1993 | Turner ........................ 370/60 |
| 5,339,311 A | 8/1994 | Turner ........................ 370/60 |
| 5,367,523 A | 11/1994 | Chang et al. ................. 370/84 |
| 5,689,508 A | 11/1997 | Lyles ......................... 370/391 |
| 5,781,531 A | 7/1998 | Charny ....................... 370/232 |
| 5,793,747 A | 8/1998 | Kline ......................... 370/230 |
| 5,818,815 A * | 10/1998 | Carpentier et al. .......... 370/218 |
| 5,850,399 A | 12/1998 | Ganmukhi et al. ........... 370/412 |
| 5,917,822 A | 6/1999 | Lyles et al. .................. 370/395 |
| 5,923,644 A | 7/1999 | McKeon et al. ............. 370/230 |
| 5,923,656 A | 7/1999 | Duan et al. .................. 370/395 |
| 5,926,459 A | 7/1999 | Lyles et al. .................. 370/230 |
| 5,940,375 A | 8/1999 | Soumiya et al. ............. 370/249 |
| 5,959,993 A | 9/1999 | Varma ......................... 370/397 |
| 5,995,511 A | 11/1999 | Zhou et al. .................. 370/412 |
| 5,996,019 A | 11/1999 | Hauser et al. ............... 709/235 |
| 6,226,267 B1 * | 5/2001 | Spinney et al. .............. 370/235 |
| 6,373,846 B1 * | 4/2002 | Daniel et al. ............. 370/395.65 |
| 6,385,673 B1 * | 5/2002 | DeMoney ..................... 710/60 |
| 6,426,943 B1 * | 7/2002 | Spinney et al. .............. 370/235 |
| 6,438,630 B1 * | 8/2002 | DeMoney ..................... 710/56 |

FOREIGN PATENT DOCUMENTS

WO        WO 97/14240        4/1997        ......... H04L/12/56

OTHER PUBLICATIONS

IBM Technical Disclosure Bulletin, vol. 35, No. 2, Jul., 1992, pp. 233–239 "Architecture for High Performance Transparent Bridge".

* cited by examiner

*Primary Examiner*—Jeffrey Gaffin
*Assistant Examiner*—Angel L Casiano
(74) *Attorney, Agent, or Firm*—Joscelyn G. Cockburn; Kenneth A. Seaman

(57) ABSTRACT

A system and method uses grouped calendars, flow queues, pointers and stored rules to process information packets so that different flow control characteristics associated with the information units are maintained.

19 Claims, 6 Drawing Sheets

METHOD AND SYSTEM FOR NETWORK PROCESSOR SCHEDULER

CROSS REFERENCE TO RELATED PATENTS

The present invention is related to the following documents, all of which are assigned to the assignee of the present invention and which are specifically incorporated herein by reference:

Patent application Ser. No. 09/384,691, filed Aug. 27, 1999 by Brian Bass et al., to entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to herein as the Interface Patent.

Patent application Ser. No. 09/330,968 filed Jun. 11, 1999 and entitled "High Speed Parallel/Serial Link for Data Communications", sometimes referred to as the Link Patent.

Patent application Ser. No. 09/548,910 filed concurrently by Brian M. Bass et al. and entitled "Method and System for Network Processor Scheduling Outputs Based on Multiple Calendars". This patent is sometimes referred to herein as the Calendar Scheduling Patent.

Patent application Ser. No. 09/548,911 filed concurrently by Brian M. Bass et al. and entitled "Method and System for Network Processor Scheduling Based on Calculation". This patent is sometimes referred to herein as the Calculation Patent.

Patent application Ser. No. 09/834,141 filed Apr. 13, 2001 by Brian M. Bass et al., priority date Apr. 13, 2000 from provisional application Ser. No. 60/196831 and entitled "Method and System for Network Processor Scheduling Based on Service Levels". This patent is sometimes referred to herein as the Service Level Patent.

Patent application Ser. No. 09/548,912 filed concurrently by Brian M. Bass et al. and entitled "Method and System for Network Processor Scheduling Outputs Using Queueing". This patent is sometimes referred to herein as the Queueing Patent.

Patent application Ser. No. 09/548,913 filed concurrently by Brian M. Bass et al. and entitled "Method and Sytstem for Network Processor Scheduling Outputs using Disconnect/Reconnect Flow Queues". This patent is sometimes referred to herein as the Reconnection Patent.

Patent application Ser. No. 09/546,651 filed Apr. 10, 2000 by Brian M. Bass et al. and entitled "Method and System for Minimizing Congestion in a Network". This patent is sometimes referred to herein as the Flow Control Patent.

Patent application Ser. No. 09/547,280 Apr. 11, 2000 and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing unit toward a data transmission network through a MAC. More particularly, the present invention involves scheduling using a plurality of algorithms to handle a plurality of users who are processing variable size information packets or frames, providing an order to the frames being provided from the flow control system (which may be of the type described in the referenced Flow Control Patent) toward the data transmission network while allowing for a plurality of different priorities to be accorded to the different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over WP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented. It is desirable to allow a variety of different priorities or scheduling algorithms to a user, with the user deciding whether he wants (and will pay the changes associated with) a guaranteed bandwidth, best effort, or a guaranteed bandwidth with best effort for peak. In addition, it is desirable that a system for allocating bandwidth have a system for enforcing the priorities and bandwidth which have been selected by a user by denying the user capacity in excess of that which the user has selected and paid for.

Some prior art systems handle outgoing information units from a processing system in a variety of ways. One suggestion is to use a round robin scheduler with fairness amongst a set of queues. Another one employs several different levels of priorities and a queue for each. In such a system, you have an absolute priority where the highest priority work is processed first and the lowest priority work may never get serviced. Still another method of scheduling outputs involves a plurality of prioritized lists. It is also known to use a hierarchical packet scheduling system. There are even systems which use several different scheduling methods in determining the order in which information units are to be sent toward a data transmission network, using a combination of different scheduling techniques.

Other systems have used a weighted priority technique implemented in the form of a round robin—which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a packet or frame in determining which customers to serve adds a measure of fairness to a service system, in that a user who is processing large frames takes up more of the system capacity and therefore should receive service less often than a user with small frames. Some of the prior art systems consider the size of the transmission in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit. An ATM system with a weight-driven scheduler is one of the solutions which is known in the prior art to schedule outputs from an ATM system.

In any such system, it would be desirable to accommodate system constraints like allocating a certain guaranteed bandwidth to a customer, regardless of frame size, while providing a mechanism to provide the following additional features: accommodating peak inputs which exceed the guaranteed bandwidth while providing protection for large and persistent exceeding of a system parameter and yet efficiently and equitably use the capacity of the network processor to provide outputs to the data transmission network.

It would be desirable to have a system which has maximum flexibility to allow for different types and levels of service as desired. For example, some users want a minimum bandwidth, others might want a minimum bandwidth but allows for bursts, still others may be interested in an economy service which provides for a "best effort" service, either with or without a minimum bandwidth, and any limits on bandwidth or burst size must be enforceable by the scheduling system. It would be desirable if a scheduling system could have any or all of these features in a simple and efficient system which accommodates variable packet length and provides for a weighted fair queueing system of allocating unused bandwidth, but, unfortunately such systems do not exist in the prior art.

Thus, the prior art systems for handling data packets for transmission to a network have undesirable disadvantages and limitations which had an effect either on the versatility of the system or the speed with which it could operate.

SUMMARY OF THE INVENTION

The present invention overcomes the disadvantages and limitations of the prior art systems by providing a simple, yet effective, way of handling information units or frames coming out of a processing system and directing frames to output ports for dispatch to a data transmission network. The present invention has particular application to a system in which packets of variable length are being handled from a plurality of users and where a level of service commitment has been made to at least some of the users.

The present invention allows the use of multiple types of service level agreements or commitments made to different users of the system. That is, a minimum guaranteed bandwidth could be provided to one user while other users enjoy shared bandwidth, a peak bandwidth could be permitted for a limited duration of time and maximum burst level service could be provided to a user, all as programmed and without interfering with the service provided to other users.

The present invention has the advantage that it allows the efficient use of bandwidth resource and allows service level commitments to be fulfilled while allowing any remaining bandwidth to be used efficiently and equitably.

The present invention also has the advantage of enforcing resource allocations while accommodating bursts. That is, a user can transmit some amount of traffic at a burst rate which exceeds his defined bandwidth for a limited period of time, but, if the user does so for a prolonged period, that user is prohibited from transmitting in excess of his normal bandwidth until he has compensated for the excessive usage. This is accomplished through a system of "credits" for the flow queue for the respective user which have built up while the user was not using his full bandwidth.

The present system also has the advantage of providing a push down stack in which the latest request for service scheduled for a given time slot or cycle is given priority. This is based on the assumption that the user scheduled later must have a higher priority and any delay in serving that user would be a greater percentage delay than a similar delay in serving a lower priority user. Use of this last-in-first-out (LIFO) system for fulfilling slot requests allows the system to minimize the perceived delay in service as a percentage of the normal intervals between successive service when the system overloaded, that is, it has more work than can be handled at the scheduled time.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENTS

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
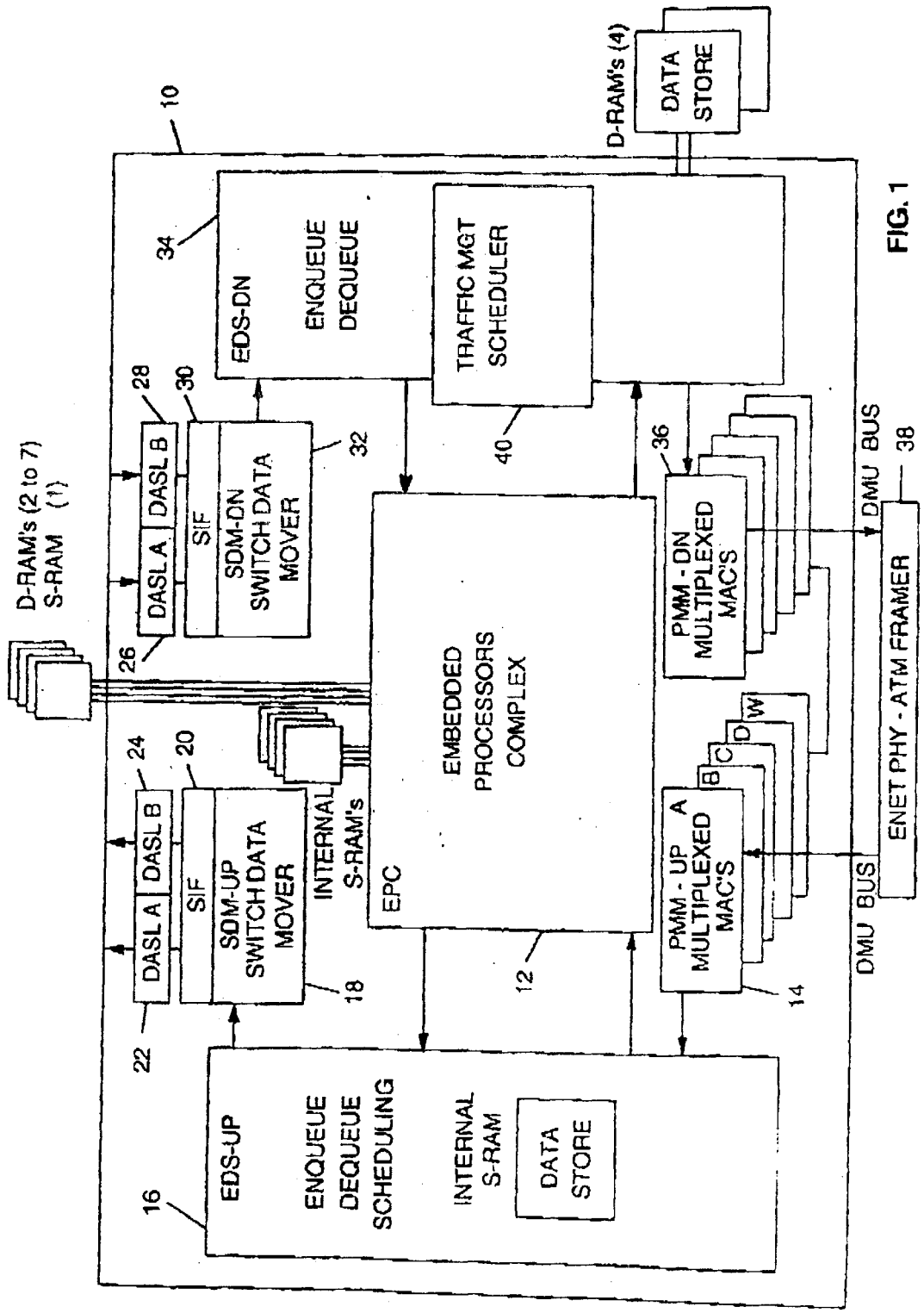
FIG. 1 is a block diagram for an interface device including embedded processor complex which is described in the NPU Patent, showing a DN Enqueue system and scheduler useful in practicing the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, Switch Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, switch interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors. After the input units or frames are processed by one of the plurality of processors in the embedded processor complex, the completed information units are sent to the switch (through SDM-UP 18, SIF 20, and DASL-A or -B 22 or 24) to be delivered to an egress side of a network processor. Once the information units are received on the egress side of the network processor, they are processed by one of the plurality of processors in the embedded processor complex 12, and when the egress processing is completed, they are scheduled through the scheduler 40 out of the processing unit 10 and onto the data transmission network through the PMM-DN multiplexed MAC's 36 and the physical layer 38.

Figure 2:
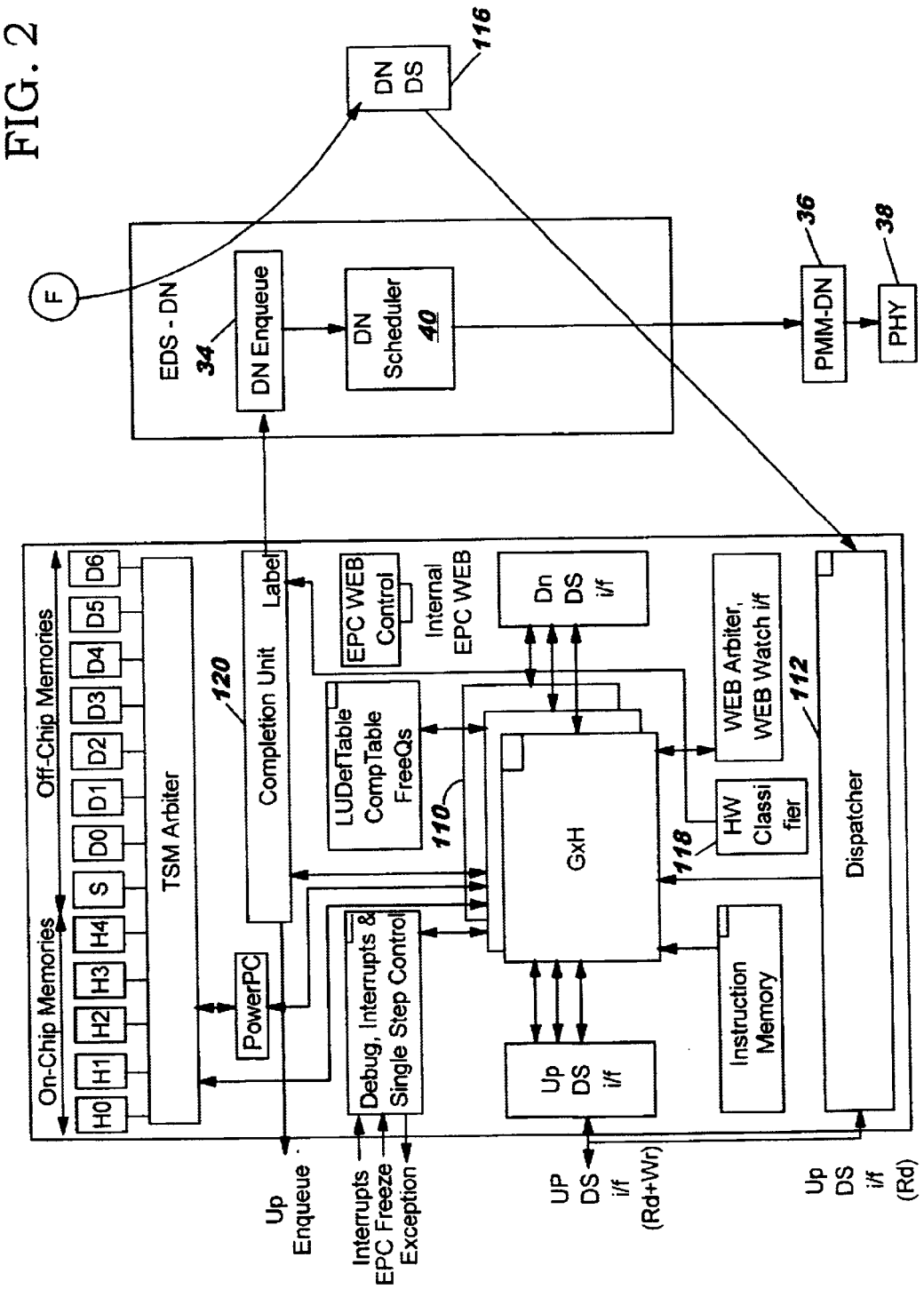
FIG. 2 is a block diagram of an embedded processor complex of type shown in FIG. 1, with the DN Enqueue (and its included scheduler) useful in understanding the present invention.

FIG. 2 is a block diagram of a processing system which can employ the present invention to advantage. In this FIG. 2, a plurality of processing units 110 are located between a dispatcher unit 112 and a completion unit 120. Each egress frame F (from a switch, not shown, attached to the present data processing system) is received and stored into an DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enquetie 34 is coupled through the PMM DN MAC's 36, then by the DMU data bus to the physical layer 38 (the data transmission network itself).

The egress scheduler 40 of FIG. 2 provides a structure and method of operation which permits the functions of scheduling frame transmission from a network processing unit to a data transmission network in accordance with a minimum bandwidth algorithm, peak bandwidth algorithm, weighted fair queueing techniques and maximum burst size scheduling in a single unified scheduler system.

Figure 3:
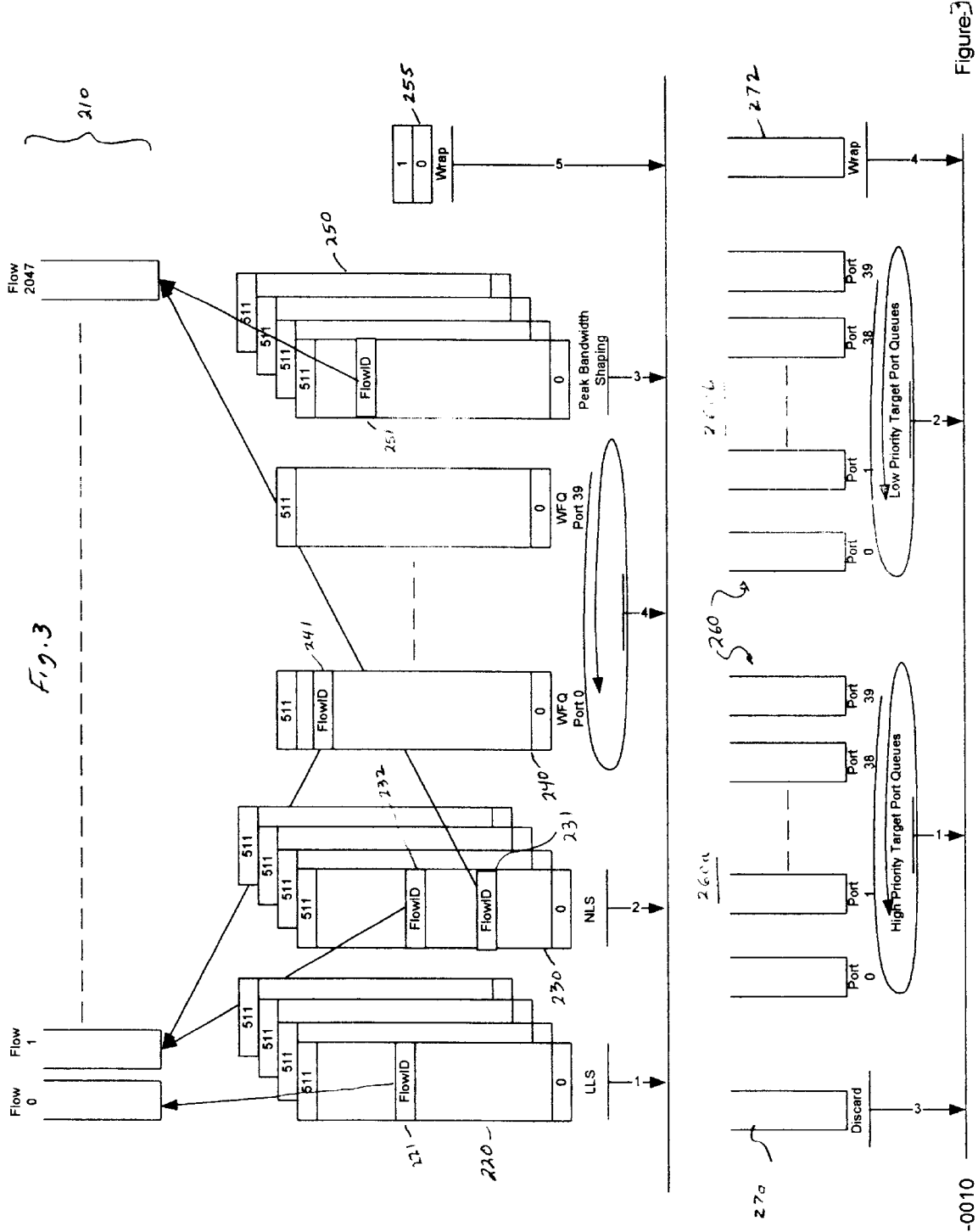
FIG. 3 illustrates the scheduler of FIGS. 1–2, illustrating a system for scheduling egress of variable length packets according to the preferred embodiment of the present invention, an "egress scheduler" using flow queue control blocks, frame control blocks and target port queues.

The scheduler system illustrated in FIG. 3 is comprised of a plurality of flows 210, time-based calendars 220, 230, 250, weighted fair queueing (WFQ) calendars 240 and target port queues 260.

The flows 210 are control structures that are used to maintain ordered lists of frames which share common system characteristics based on assignment, that is, the level of service that the associated user has selected and paid for. These characteristics include minimum bandwidth, peak bandwidth, best effort bandwidth and maximum burst size quality of service (QoS) requirements. In addition to flow queues set up for the purpose of supporting QoS for communication systems, the preferred embodiment requires flow queues defined for the purpose of discarding frames (i.e. filtered traffic), and the wrapping of frame data from the egress to the ingress of the network processor system.

Time-based calendars 220, 230, 250 are used for scheduling packets with minimum bandwidth and best effort peak rate requirements. As shown in FIG. 3, three time based calendars are used for this purpose: two calendars 220, 230 for minimum bandwidth and a third calendar 250 used to limit flow queues to a maximum best effort peak rate (peak bandwidth shaping). Two time-based calendars 220, 230 (one calendar 220 identified as low latency service or LLS and the other calendar 230 identified as normal latency service or NLS) provide for minimum bandwidth and allow support of different classes of service within a minimum bandwidth QoS class (i.e., low latency and normal latency).

Weighted fair queuing (WFQ) calendars 240 are used for best effort service, and best effort peak service (when used in combination with one of the time-based calendars 220, 230). Further, the WFQ calendars 240 support a queue weight that allows support of different classes of service within a best effort service QoS class. In the preferred embodiment there are 40 such WFQ calendars, corresponding to the number of supported media ports (output ports). The selection of 40 such ports is a trade off between hardware cost and design complexity and is not intended to limit the scope of the invention.

In each of the above mentioned calendars, a pointer (a Flow ID) is used to represent a flow queue's location within the calendar. Thus, flow 0 has its Flow ID 221 in calendar 220, flow 1 has a FlowID 232 in calendar 230 and FlowID 241 in the WFQ 240 and flow 2047 has a FlowID 231 in calendar 230 and FlowID 251 in calendar 250, all as indicated by the arrows in FIG. 3. Further there may be none, one, or two such pointers to a single flow queue present in the plurality of calendars in the system. Typically, pointers in a calendar do not represent un-initialized or empty flow queues. When a pointer to a flow queue (or a FlowID) is present in a particular calendar in the system, the flow queue may be referred to as being "in" that particular calendar.

Target port queues are control structures used to maintain ordered lists of frames that have common port destination and priorities. In the preferred embodiment, 2 priorities per media port (or output port) are provided to allow support of different classes of service, a so-called high priority target port queue and a so-called low priority target port queue. The selection of 2 priorities is a trade off between hardware cost and design complexity and is not intended to limit the scope of the invention. Further, the preferred embodiment includes a separate wrap queue 272 and a discard port queue 270.

Figure 4:
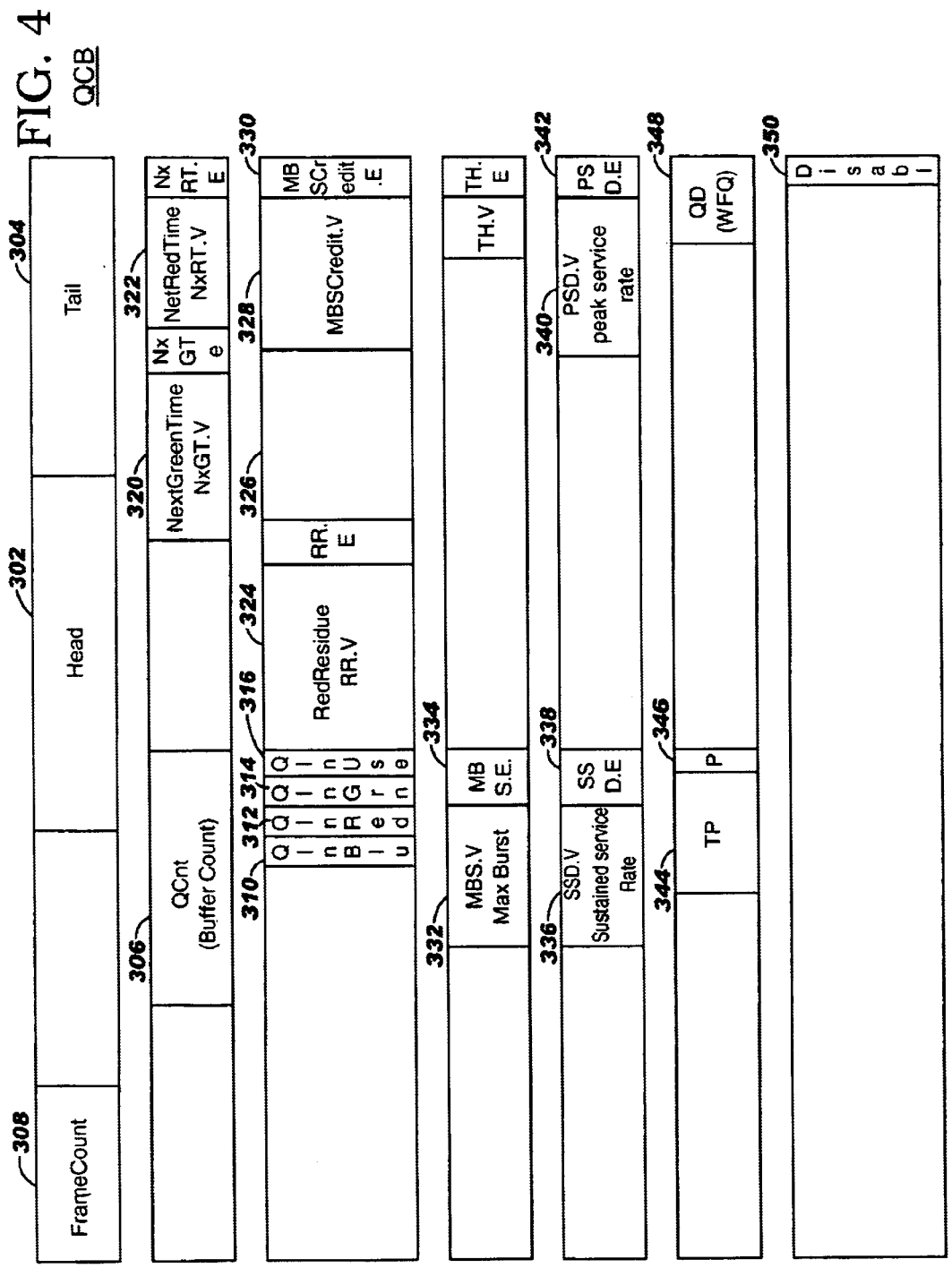
FIG. 4 illustrates a flow queue control block used in conjunction with the egress scheduler of FIG. 3.

The flow queue control block (or QCB) of the preferred embodiment, illustrated in FIG. 4, is comprised of a plurality of fields used to manage the ordered list of packets enqueued to the flow queue, specify the scheduling characteristics and the current scheduling status of the flow queue. The fields are defined as follows:

Head field 302, Tail field 304, QCnt field 306 and Frame-Count field 308 are used to manage the first-in-first-out (FIFO) ordered list of packets. The Head field 302 is a pointer to the top of the list and references a Frame Control Block which is described below and shown in FIG. 5. The Tail field 304 points to the last packet in the list. The QCnt field 306 contains the number of data buffers in use by all the packets that are members of the flow queue. The Frame-Count field 308 contains the number of packets that are members of the flow queue. Those skilled in the art will readily see that this one of many methods of maintaining an ordered list and other methods may be used without altering the invention, however for application within a communication system, a FIFO list is required.

QinBlue field 310, QinRed field 312, QinGrn field 314, and QinUse field 316 are scheduling status information. The QinBlue field 310 indicates if the flow queue is currently in a WFQ calendar 240 in FIG. 3. The QinRed field 312 indicates if the flow queue is currently in one of the time-based calendars 220, 230 in FIG. 3 used for minimum bandwidth service. The QinGrn field 314 indicates if a flow queue is currently in the time-based calendar 250 used for peak bandwidth shaping. The QinUse field 316 indicates if the time stamp, residue, and MBSCredit fields (to be described later) are valid.

NextGreenTime field 320 is a time stamp field used for peak bandwidth shaping. When a frame queue is serviced, the current time and the peak service rate are used to determine the next time this flow queue can be serviced without violating the peak service rate configuration.

NextRedTime field 322 is a time stamp field used to prevent a flow queue from obtaining a higher minimum bandwidth than is allowed by the sustained service rate configuration. When a flow queue is serviced and the last frame is dequeued from the flow queue, the current time and the sustained service rate are used to determine the next time this flow can be serviced without violating the sustained service rate configuration.

RedResidue fields (RR.V and RR.E) 324, 326 contain results from step calculations within the calendar. The residue is used to compensate for the inaccuracy of the step calculations that occur when a flow queue has been selected for service and must be moved to a new location in the calendar. MBSCredit fields (MBSCredit.V and MBSCredit.E) 328, 330 contain the current number of tokens that this flow queue currently possesses which are used to control the size of bursts above the minimum bandwidth allowed for this flow queue.

Max Burst fields (MBS.V and MBS.E) 332, 334 contain the maximum burst size configuration for this flow queue. It is the maximum number of tokens allowed to this flow queue limiting the size of bursts above the minimum bandwidth.

Sustained service rate fields (SSD.V and SSD.E) 336, 338 contain the configuration of the minimum bandwidth configuration for this flow queue. A value of 0 indicates no minimum bandwidth component.

Peak service rate fields (PSD.V and PSD.E) 340, 342 contain the configuration of the peak bandwidth for this flow queue. A value of 0 indicates no peak bandwidth component.

TP field 344 indicates the target port queue that packets in the flow queue are moved to once they are scheduled.

P field 346 indicates the priority used by the flow queue. When the flow queue is configured for minimum bandwidth, high priority (P=0) indicates that the LLS time-based calendar 220 is used. Low priority (P=1) indicates that the NLS calendar 230 is used. When the packets in the flow queue are moved to the target port queues 260, this field is used to determine if the packet is enqueued to the high priority queue 260a or low priority queue 260b for the target port.

Queue weight field (QD) 348 is used to configure the flow queue for best effort service. By modifying the weight, the proportion of the available target port bandwidth that is allocated to the flow queue is changed. A QD of 0 indicates that the flow queue has no best effort component.

Qdisable field 350 is used to modify the normal operation of the scheduler with respect to this flow queue. When set to 1, packets are enqueued to the discard queue 270 instead of the target port queue 260 indicated by the TP field.

A novelty of this invention is the way that the combination of calendars and queues is used to accomplish scheduling of flow queues for service with various QoS requirements. In the preferred embodiment the flowing combinations are allowed:

| QoS | P | SD | PSD | MBS | QD |
|---|---|---|---|---|---|
| Low latency with Minimum BW shaping | 0 | ≠0 | 0 | 0 | 0 |
| Normal latency with Minimum BW shaping | 1 | ≠0 | 0 | 0 | 0 |
| Best Effort | | | | | |
| Best Effort | 1 | 0 | 0 | 0 | ≠0 |
| Best Effort with Peak Rate | 1 | 0 | ≠0 | 0 | ≠0 |
| Normal latency with Minimum BW shaping with Best Effort | 1 | ≠0 | 0 | 0 | ≠0 |
| Normal latency with Minimum BW shaping with Best Effort, and Peak Rate | 1 | ≠0 | ≠0 | 0 | ≠0 |
| Normal latency with Minimum BW shaping with Best Effort, and MBS | 1 | ≠0 | 0 | ≠0 | ≠0 |
| Normal latency with Minimum BW shaping with Best Effort, Peak Rate, and MBS | 1 | ≠0 | ≠0 | ≠0 | ≠0 |

Figure 5:
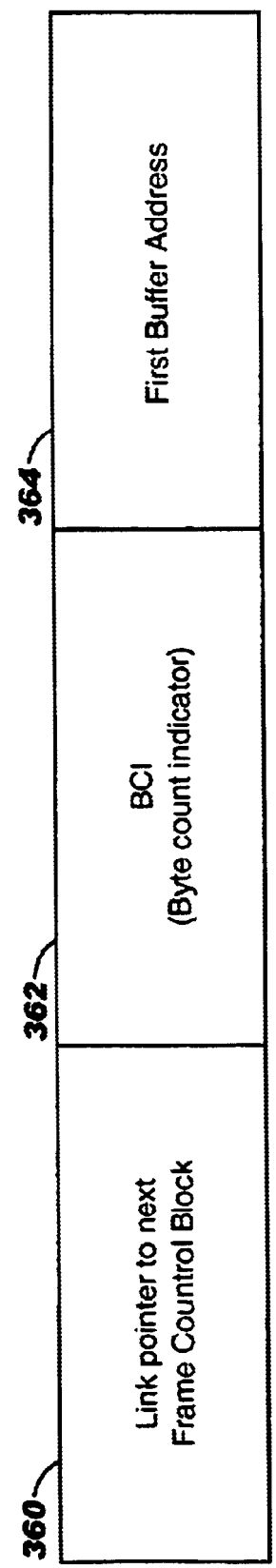
FIG. 5 illustrates a frame control block used in connection with the egress scheduler of FIG. 3.

The frame control block (FCB) of the preferred embodiment is illustrated in FIG. 5 and includes a plurality of fields used to manage a packet as it passes through the flow queues and the target port queues, indicating the size and location of the packet in the network processor's data store. The fields of the FCB are as follows:

- Link pointer 360 to next frame control block FCB. This field is used to manage the lists within the flow queue and the target port queues.
- BCI field 362 contains information about the length of the packet. In the preferred embodiment, the BCI field 362 indicates the number of buffers used by the packet, the starting byte within the first buffer and the ending byte within the last buffer.
- First buffer address 364 indicates the location within the network processor that the first buffer of the frame resides.

Figure 6:
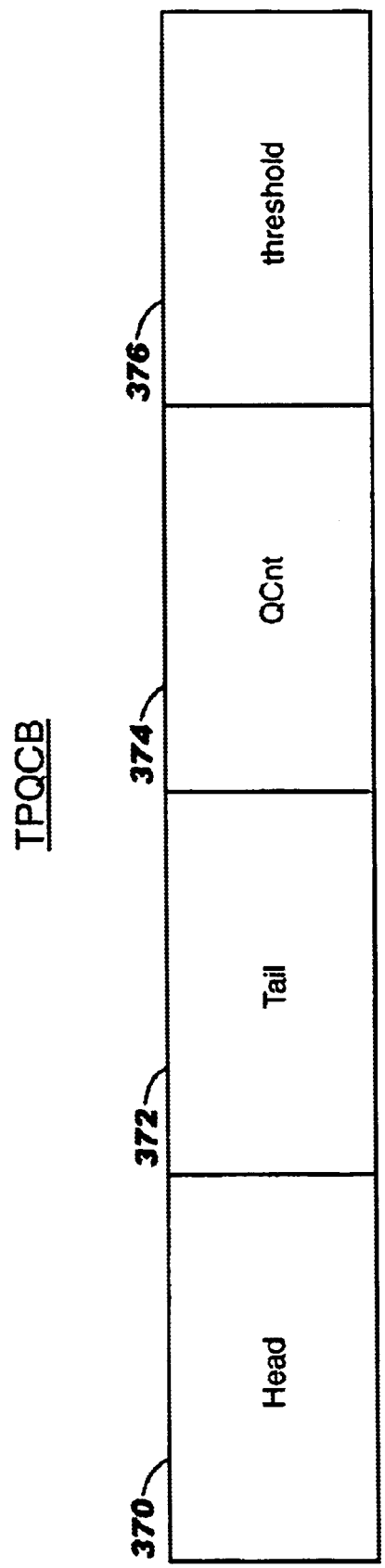
FIG. 6 illustrates control block information for the target port queues shown in FIG. 3.

The target port queue control block (TPQCB), illustrated in FIG. 6, is comprised of a plurality of fields used to manage an ordered list of packets. The TPQCB fields are as follows:

- Head field 370, Tail field 372, and QCnt field 374 are used to manage the first-in-first-out (FIFO) ordered list of packets. The Head field 370 is a pointer to the top of the list and references a Frame Control Block FCB which was described previously in connection with FIG. 5. The Tail field 372 points to the last packet in the list. The QCnt field 374 contains the number of data buffers in use by all the packets that are members of the target queue. A threshold field 376 is provided to configure when the associated WFQ calendar is permitted to provide a candidate for selection of service. Those skilled in the art will readily see that this one of many methods of maintaining an ordered list, other methods may be used without altering the invention, however for application within a communication system, a FIFO list and a threshold is required.

With all the components of the scheduler 40 defined along with the associated data, the operation of the scheduler 40 can be described.

Operation

A period is selected to be defined as a scheduler_tick. During this period:

1. a packet may be enqueued into a flow queue,
2. one flow queue may be selected for service from all the plurality of calendars,
3. a packet may be de-queued from a flow queue and enqueued to a target port queue,
4. a packet may be selected to be moved from a target port queue to the media where the data is transmitted towards its destination.

Any combination of these actions—none, one, two, three or all, may occur during a single scheduler_tick period.

Packet Enqueue to a Flow Queue

When a packet is enqueued into a flow queue, the flow queue may be found to be in use (QinUse field 316=1) and located in all calendars that it has been configured for. In this case, only the enqueue, or the list management, action is taken: The Tail field 304, QCnt field 306 and FrameCount field 308 of the flow queue control block QCB shown in FIG. 4 are updated.

In another case, the flow queue may be found not in use (QinUse field 316=0) and as a consequence is not in any of the assigned calendars. Once the list management action has been taken, the flow queue must be located into an appropriate calendar by placing a pointer to the flow queue into the correct location in the calendar. An examination of the sustained service rate field 336 and the queue weight field 348 is required. If the sustained service rate field 336 is non zero, then a pointer to the flow queue is added to either the NLS (P=1) or the LLS (P=0) time-based calendar (220 or 230 in FIG. 3) at a location indicated by the current time and the QinRed field 312 is set to 1 in flow queue control block QCB of FIG. 4. If the sustained service rate is 0 then the queue weight field 348 must be non-zero, and a pointer to the flow queue is added to the appropriate location in the WFQ calendar indicated by the target port field and the QinBlue field 310 is set to 1. Since the flow queue was found not in use, additional modifications to the fields of the flow queue control block must occur. If the Max Burst field 332 is non-zero, then the field is copied into the MBSCredit field 328. If the flow queue is placed into a WFQ calendar, then the peak service rate field 340 must be examined. If the peak service rate field 340 is found to be non-zero, then the value of the current time is placed into the NextGreenTime field 320. The RedResidue field 324 is cleared, and the QinUse field 316 is set to 1.

In another case, the flow queue may be found in use, but is not in any of the assigned calendars. Once the list management action has been taken, the flow queue must be located into an appropriate calendar by placing a pointer to the flow queue into the correct location in the calendar shown in FIG. 3. An examination of the sustained service rate field 336 and the queue weight field 348 is required. If the sustained service rate field 336 is non zero, then a pointer to the flow queue is added to either the NLS (P=1) or the LLS (P=0) time based calendar. The location within the calendar is determined by an examination of the NextRedTime field 322. If the NextRedTime field 322 indicates a time later than the current time, then the flow queue is located in the calendar at the time indicated by the NextRedTime field 322, otherwise the flow queue is located in the calendar at the time indicated by the current time, the QinRed field 312 is set to 1, and the RedResidue field 324 is cleared in flow queue control block QCB of FIG. 4. If the sustained service rate field 336 is zero, then the queue weight field 348 must be non-zero and the flow queue will be located into either the WFQ indicated by the TP field 344, or it will be located into the peak bandwidth shaping calendar 250 in FIG. 3. If the peak service rate field 340 is 0, then the flow queue is placed into the WFQ calendar 240 in FIG. 3, otherwise the NextGreenTime field 320 must be examined. If the NextGreenTime field 320 indicates a time later than the current time, then the flow queue is located into the peak bandwidth shaping calendar 250 at the location indicated by the NextGreenTime field 320 and the QinGm field 314 is set to 1, otherwise, the flow queue is placed into the appropriate location in the WFQ calendar 240 indicated by the target port field 344, and the QinBlue field 310 is set to 1. Since the flow queue was not in any of the assigned calendars, additional modifications to the fields of the flow queue control block QCB of FIG. 4 must occur. If the Max Burst field 332 is non-zero, then the MBSCredit field 328 must be updated to indicate the token earned while the flow queue was empty. A calculation using the current value of the MBSCredit field 328, the current time, and the NextRedTime field 322 are used to determine the number of tokens earned, however, the value in the MBSCredit field 328 shall not be set to be greater than the value of the Max Burst field 332. If the flow queue is placed into either the LLS or the NLS queue 220 or 230 in FIG. 3, the peak service rate field 340 is examined. If the peak service rate field 340 is greater than zero, then the NextGreenTime field 320 is examined. If the current time is later than the time indicated by the NextGreenTime field 320, then the NextGreenTime field 320 is set to the value indicated by the current time.

In another case, the flow queue may be found in use, but is in only one of the two assigned calendars. As will be described below, this occurs when the flow queue is located in either the LLS calendar 220 or NLS calendar 230 (QinUse=QinRed=1, and QinBlue=QinGrn=0) and the queue weight field 348 is non zero. Once the list management action has been taken, the flow queue must be located into an appropriate calendar by placing a pointer to the flow queue into the correct location in the calendar 240 or 250. In this case, the flow queue will be located into either the WFQ calendar 240 indicated by the TP field 344, or it will be located into the peak bandwidth shaping calendar 250. If the peak service rate field 340 is 0, then the flow queue is placed into the WFQ calendar 240, otherwise the NextGreenTime field 320 must be examined. If the NextGreenTime field 320 indicates a time later than the current time, then the flow queue is located into the peak bandwidth shaping calendar 250 at the location indicated by the NextGreenTime field 320 and the QinGm field 314 is set to 1, otherwise, the flow queue is placed into the appropriate location in the WFQ calendar 240 indicated by the target port field 344, and the QinBlue field 310 is set to 1.

Flow Queue Selection

Each calendar, using its own selection algorithm, provides one flow queue candidate for service each scheduler_tick.

Selection among the candidates is illustrated with reference to FIG. 3. A first selection occurs among the WFQ calendar candidates. This selection utilizes a work conserving round robin. A second selection occurs among the WFQ final candidate, the LLS calendar 220, NLS calendar 230, Peak Bandwidth Shaping calendar 250, and wrap calendars 255. This is an absolute priority selection where the highest priority calendar is selected first. Calendar priority using the calendar illustrated in FIG. 3 may be defined in the following order, with the highest priority first:

1. LLS calendar 220
2. NLS calendar 230
3. Peak bandwidth shaping calendar 250
4. WFQ calendar final candidate 240
5. Wrap calendar 255

Packet Dequeue from a Flow Queue (Flow Queue Service)

Once the calendar and its candidate flow queue is selected for service, the contents of the flow queue control block QCB is examined. If the flow queue is found to contain packets, then the de-queue, or list management, action occurs. The Head field 302, QCnt field 306 and FrameCount field 308 are updated and the pointer to the dequeued packet's frame control block is enqueued to the target port queue 260 indicated by the flow queue control block's TP field 344 and P field 346. If the Max Burst field 332 is non zero, then the MBSCredit field 328 is updated. The new value for MBSCredit field 328 is determined from the current value of MBSCredit field 328, the BCI field 362 to determine the frame length, and the sustained service rate field 336. In the preferred embodiment, MBSCredit field 328 may take on negative values. If the flow queue is found empty, then changes to the Head field, QCnt field and FrameCount field do not occur, but changes to other fields in the flow queue control block occur as described below.

If the selected calendar is either the LLS calendar 220 or the NLS calendar 230, then the FrameCount field 308 is examined. If the FrameCount field 308, after being updated by the list management actions, is greater than 0, then the pointer to the flow queue must be moved from its present location in the calendar. The BCI field 362 in the frame control block shown in FIG. 5 is used to determine the length of the packet or frame. The sustained service rate field 336, the length of the frame from BCI field 362, the current pointer (the current service location within the calendar), and the current time are used to determine the new location the pointer to the flow queue is moved to and the new value of the RedResidue field 324. If the FrameCount field 308, after being updated by the list management actions, is equal to 0, then the pointer to the flow queue must be removed from the calendar and the QinRed field 312 of the flow queue control block CB of FIG. 4 is set to zero. When removing a flow queue from either the LLS calendar or the NLS calendar 230, additional modifications to the fields of the flow queue control block must occur. The BCI field 362 in the frame control block FCB of FIG. 5 is used to determine the length of the packet. The sustained service rate, the length of the frame, the current pointer (the current service location within the calendar), and the current time are used to determine the new value of the NextRedTime field 322 and the RedResidue field 324.

If the calendar is a WFQ calendar (240 in FIG. 3) then the FrameCount field 308 is examined. If the FrameCount field 308, after being updated by the list management actions, is greater than 2, then the pointer to the flow queue must be moved from its present location in the calendar into either the WFQ calendar indicated by the TP field 344, or it will be located into the peak bandwidth shaping calendar 250. If the peak service rate is 0, then the flow queue is placed into the WFQ calendar 240, otherwise the NextGreenTime field 320 must be examined. If the NextGreenTime 320 indicates a time later than the current time, then the flow queue is located into the peak bandwidth shaping calendar 250 of FIG. 3. The location is determined by an examination of the BCI field 362 in FIG. 5 to determine the length of the packet, the peak service rate 340, and the NextGreenTime field 320. The NextGreenTime field 320 is updated to indicate this location in the peak bandwidth shaping calendar 250. If the current time is later than the time indicated by the NextGreenTime field 320, then the flow queue is placed into the WFQ calendar 240, and the NextGreenTime field 320 is updated in the flow queue control block QCB. The new value for NextGreenTime field 320 is determined by an examination of the BCI field 362 to determine the length of the packet, the peak service rate field 340, and the current time.

If the calendar is a WFQ calendar 240 and the FrameCount field 308 is examined and found to be equal to 1 after being updated by the list management actions, and the sustained service rate is non-zero, or if the FrameCount field 308 is equal to 0 after being updated by the list management actions, then the flow queue is removed from the WFQ calendar 240, QinBlue field 310 is set to 0 and the NextGreenTime field 320 must be updated. If the NextGreenTime field 320 indicates a time later than the current time, then the new value of NextGreenTime field 320 is determined by an examination of the BCI to determine the length of the packet, the peak service rate, and the NextGreenTime. If the current time is later than the time indicated by the NextGreenTime, then the new value for NextGreenTime field 320 is determined by an examination of the BCI field 362 to determine the length of the packet, the peak service rate, and the current time.

If the calendar is the peak bandwidth shaping calendar 250 and the FrameCount field 308 is examined and found to be equal to 1 after being updated by the list management actions, and the sustained service rate field 336 is non-zero, or if the FrameCount field 308 is equal to 0 after being updated by the list management actions, then the flow queue is removed from the peak bandwidth shaping calendar 250, QinGrn field 314 is set to 0 and the NextGreenTime field 320 must be updated. The new value for NextGreenTime field 320 is determined by an examination of the BCI field 362 to determine the length of the packet, the peak service rate field340, the current pointer (the current service location within the calendar) and the current time.

Engueue to a Target Port Queue

As previously discussed, the TP field 344 and P field 346 of the selected flow queue control block determine the target port queue that the packet is enqueued to. The list management actions consist of updating the Tail field 372 and the QCnt field 374 for the TPQCB.

Target Port Queue Selection

Each target port queue indicates if it has a valid candidate for selection. Referring to FIG. 3, there are two stages of selection. The first selection groups the high priority target port queues 260a as a first group, and the low priority target port queues 260b as a second group. Within these two groups, selection is made using a work conserving round robin. A second selection occurs between the first selection of the high and low priority target ports 260a, 260b, the discard port 270 and the wrap port 272. This is an absolute priority selection where the highest priority is selected first. Selection priority illustrated in FIG. 3, is 1. First selection from the high priority target port queues 260*a*
2. First selection from the low priority target port queues 260*b*
3. Discard port 270
4. Wrap port 272

Of course, many modifications of the present invention will be apparent to those skilled in the relevant art in view of the foregoing description of the preferred embodiment, taken together with the accompanying drawings. For example, the location of the data for a particular flow is described as kept in a flow queue control block or QCB, whereas it may be located in any place where the data is accessible for use, and need not be accumulated into a single record. The number of ports, the types of service and the use of low latency and normal latency are all forms of design choice and more or less ports could be used. Additionally, many modifications can be made to the system implementation and the system of priorities and various algorithms can be used for determining priority of service without departing from the spirit of the present invention. Further, some of the features of the present invention can be used without the corresponding use of other features. Accordingly, the foregoing description of the preferred embodiment should be considered as merely illustrative of the principles of the present invention and not in limitation thereof.

What is claimed is:

1. A system for periodically moving information units from a plurality of sources to an output destination based on information stored about each of the plurality of sources, the system comprising:
    a first time-based calendar which handles some of the information units based on the information stored about the plurality of sources;
    a second time-based calendar which handles other of the information units based on the information stored about the plurality of sources;
    a third calendar which is time-independent which handles other of the information units based on information stored about the plurality of sources;
    a fourth calendar which provides a delay in handling information units based on information stored about the information units; and
    a timer which periodically generates a signal which moves a single information unit to the output destination, with the single information unit chosen based on stored rules.

2. A system of the type described in claim 1 wherein the stored rules about the plurality of sources includes a value indicating the sustained service rate for the source.

3. A system of the type described in claim 2 wherein the value indicating the sustained service rate is used for determining when that source will be eligible for service.

4. A system of the type described in claim 3 wherein the system further includes an indicator of maximum allowed burst and provides for the possibility of service for such burst above the value of the sustained service rate.

5. A system of the type described in claim 4 wherein the system further includes a system for detecting excess usage above the sustained and burst rate and uses the fourth calendar to delay information units when excess usage is detected.

6. A system of the type described in claim 5 wherein the system further includes a discard function and the priority of the discard function for service is less than the four calendars.

7. A system of the type described in claim 5 wherein the system further includes a wrap function and the wrap function is assigned a priority for service which is less than that of the four claendars.

8. A method of selecting during any processing cycle one processed information unit from a plurality of information units ready at that time for transmission from a network processor toward a data transmission network, the method comprising the steps of:
    receiving priority information about each of the information units ready for processing;
    placing each information unit ready for transmission into one of several prioritized queues based on the priority information associated with each processing unit, one of the queues being time-based and an other one of the queues being time independent;
    selecting one of the queues to service at each time cycle based on a stored set of rules and selecting one of the information units from the selected queue according to an algorithm; and
    sending the selected information unit from one processor to the network.

9. A method including the steps of claim 8 wherein the step of selecting one of the queues for service includes a set of rules defining the priority of service of the calendars.

10. A method including the steps of claim 9 where the step of sending the selected information unit from the processor to the network includes the step of determining whether the network can receive the information unit and, if it cannot, delaying the sending of that information unit until the network can receive the information unit.

11. A system comprising:
    a plurality of calendars partitioned into groups with each group handling assigned information units so that different flow control characteristics associated with the assigned information units are maintained;
    a plurality of flow queues that maintain ordered list of frames which share commonly assigned flow characteristics;
    at least one flow queue control block (QCB) that stores information used to manage ordered list of frames in at least one of the flow queues; and
    a pointer to identify a location within a calendar whereat the at least one flow queue is being attached.

12. The system of claim 11 wherein each calendar includes multiple locations to which flow queues can be attached; and
    an algorithm that selects one of the locations of flow queues from which an attached flow queue is detached.

13. The system of claim 12 further including a timer which periodically generates a signal that detaches a single flow queue from a calendar based upon stored rules.

14. The system of claim 11 further including a timer which periodically generates signals that detach previously attached flow queues from calendar based upon stored rules.

15. The system of claim 12 or claim 14 further including a plurality of target poll queues used to maintain ordered list of frames having common port destination and priorities.

16. The system of claim 15 wherein the plurality of target port queues are partitioned into high priority target port queues, low priority target port queues, at least one wrap priority queue and at least one discard priority queues.

17. The system of claim 16 further including at least one timer that generates signals that causes previously attached flow queues to target port queues location to be detached and forwarded to a port based upon stored rules.

18. The system of claim 11 wherein the groups include time based calendars and non-time based calendars.

19. The system of claim 18 wherein the time based calendars are further partitioned into groups used to schedule packets with flow characteristics including minimum bandwidth and best effort peak rate requirement.

* * * * *